United States Patent [19]
Tsuchitoi

[11] Patent Number: 5,872,900
[45] Date of Patent: Feb. 16, 1999

[54] INFORMATION PROCESSING APPARATUS AND METHOD CAPABLE OF TWO-SIDE PRINTING WITH A CORRECTLY-ORDERED OUTPUT

[75] Inventor: Naoki Tsuchitoi, Kawasaki, Japan

[73] Assignee: Canon Kabushiki Kaisha, Tokyo, Japan

[21] Appl. No.: 773,007

[22] Filed: Dec. 24, 1996

[30] Foreign Application Priority Data

Jan. 11, 1996 [JP] Japan .................................. 8-002964

[51] Int. Cl.⁶ .............................. G06F 15/00; G06K 1/00
[52] U.S. Cl. ......................... 395/111; 395/101; 395/109; 395/116; 395/115; 399/401; 399/402
[58] Field of Search ................................ 395/109, 111, 395/112, 114, 113, 115, 116; 355/23, 25, 26, 27; 399/401, 402, 408

[56] References Cited

U.S. PATENT DOCUMENTS

| | | | |
|---|---|---|---|
| 4,099,254 | 7/1978 | Andrews et al. | 355/24 |
| 4,990,941 | 2/1991 | Kawai | 355/319 |
| 5,680,198 | 10/1997 | Ohnishi | 355/23 |

*Primary Examiner*—Edward L. Coles
*Assistant Examiner*—Mark Wallerson
*Attorney, Agent, or Firm*—Fitzpatrick, Cella, Harper & Scinto

[57] ABSTRACT

Page control information is transferred to a printer to inquire about a transfer page order when a printer controller detects a two-side printing request, the page order rearrangement controller organizes a page order of print data transmitted to the printer into a two-side print page order on the basis of the transfer page order data sent back from the printer, and the printer controller transmits print data read from a storage medium on the basis of the organized two-side print page order to the printer. With the above arrangement, optimum two-side print output whose pages are correctly arranged can be obtained at a high throughput without increasing the memory resource of a printing apparatus.

18 Claims, 14 Drawing Sheets

5,872,900

INFORMATION PROCESSING APPARATUS AND METHOD CAPABLE OF TWO-SIDE PRINTING WITH A CORRECTLY-ORDERED OUTPUT

BACKGROUND OF THE INVENTION

1. Field of the Invention

The present invention relates to a printing method and apparatus which receives print data from an information processing apparatus and can perform printing on both sides of a recording medium. The invention also relates to an information processing apparatus which communicates with the printing apparatus to enable transmission the print data.

2. Description of the Related Art

In recent years, with printing apparatuses (printers) being used as output apparatuses for computers, many printers have been proposed with double-sided printing capability, in which printing is automatically performed on both sides of a sheet of paper. Double-sided printing saves energy and paper.

Generally, a printer having a two-side printing function has only one printing apparatus. In this printer, one-side printing is performed, the sheet of paper is inverted by a paper convey unit and then fed to the printing apparatus again, and the back of the sheet is printed, thereby making it possible to perform two-side printing.

In the printer described above, to avoid delaying conveyance of the paper during inversion by the paper convey unit, the following method is used. Instead of printing the back of a certain sheet of paper after the front of the sheet is printed, the front of the next sheet is printed while the preceding sheet is inverted, and then the back of the inverted sheet is printed. This method reduces or eliminates the delay caused by conveyance of the paper during inversion by the paper convey unit. In this case, the front of the next sheet of paper having a higher page number may be performed before the back of the preceding sheet having a smaller page number.

To ensure correct page order is maintained with the above method, the following method may be used. The back of a sheet is printed before the front to correctly arrange the page order, and the front of the sheet is printed after inversion, thereby correctly arranging the page order.

In this case, the back of a sheet having a higher page number may be printed prior to printing the front of a sheet having a smaller page number.

However, since page data constituted by a plurality of pages sent from a host computer are sent in an ascending order or a descending order unless a user specifies the order, the following method is used. That is, when the page numbers of pages to be actually printed are replaced with each other, page data of a page which has not been printed is stored in the printer, and the page data of the next page is extracted from the host computer to perform printing. Thereafter, printing of the page is performed on the basis of the page data which has been stored. For this reason, a storage unit for temporarily storing page data is required. This raises the cost of the apparatus.

SUMMARY OF THE INVENTION

According to a first aspect, the present invention includes a detector for detecting the presence or absence of a two-side printing request to a printing apparatus. The invention also includes a requesting device for requesting set data used to organize a page order of print data transferred to the printing apparatus when the detector detects the two-side printing request. The invention also includes a page organizer for organizing the page order of the print data transferred to the printing apparatus on the basis of set data sent back from the printing apparatus in response to the request of the requesting device.

According to a second aspect, the present invention includes a printer for printing on a recording medium based on print data received from an information processing apparatus. The invention also includes a paper-refeeding device for inversely conveying the recording medium which has the first side printed by the printing means and is discharged, and refeeding the recording medium to the printing means such that the second side of the recording medium serves as a print side. The invention also includes resource storage for storing conveyance capability resource information of the paper-refeeding means. The invention also includes a determining device for determining a transfer page order of the print data transferred from the information processing apparatus on the basis of page control information received from the information processing apparatus and the conveyance capability resource information. The invention also includes a sending-back device for sending back data representing the transfer page order determined by the determining device to the information processing apparatus.

According to a third aspect, the present invention relates to an information processing method including the steps of detecting the presence or absence of a two-side printing request to a printing apparatus, requesting set data used to organize a page order of print data transferred to the printing apparatus when the two-side printing request is detected in the detecting step, and organizing the page order of the print data transferred to the printing apparatus based on the set data sent back from the printing apparatus by the request step.

According to a fourth aspect, the present invention relates a printing method in a printing apparatus. The apparatus includes a printer for printing on a recording medium based on the print data received from an information processing apparatus, and a paper-refeeding device for inversely conveying the recording medium which has the first side printed by the printer and is discharged, and refeeding the recording medium to the printer such that the second side of the recording medium serves as a print side.

The method using this printing apparatus includes the steps of: storing conveyance capability resource information of the paper-refeeding device; determining a transfer page order of the print data transferred from the information processing apparatus based on the page control information received from the information processing apparatus and the conveyance capability resource information; and sending back data representing the transfer page order determined in the determining step to the information processing apparatus.

According to a fifth aspect, the present invention relates to a storage medium which stores a readable program applied to an information processing apparatus. The program includes the steps of: detecting the presence or absence of a two-side printing request to a printing apparatus; requesting set data used to organize a page order of print data transferred to the printing apparatus when the two-side printing request is detected in the detecting step; and organizing the page order of the print data transferred to the printing apparatus based on the set data sent back from the printing apparatus by the request step.

According to a sixth aspect, the present invention relates to a storage medium which stores a readable program applied to a printing apparatus. The printing apparatus includes a printer for printing on a recording medium based on the print data received from an information processing apparatus, and a paper-refeeding device for inversely conveying the recording medium which has the first side printed by the printer and is discharged, and refeeding the recording medium to the printer such that the second side of the recording medium serves as a print side. The program applied to the apparatus includes the steps of: storing conveyance capability resource information of the paper-refeeding device; determining a transfer page order of the print data transferred from the information processing apparatus based on the page control information received from the information processing apparatus and the conveyance capability resource information; and sending back data representing the transfer page order determined in the determining step to the information processing apparatus.

Other objects and characteristic features of the present invention will be apparent from the following specification and drawings.

DESCRIPTION OF THE PREFERRED EMBODIMENTS

First Embodiment

Figure 1:
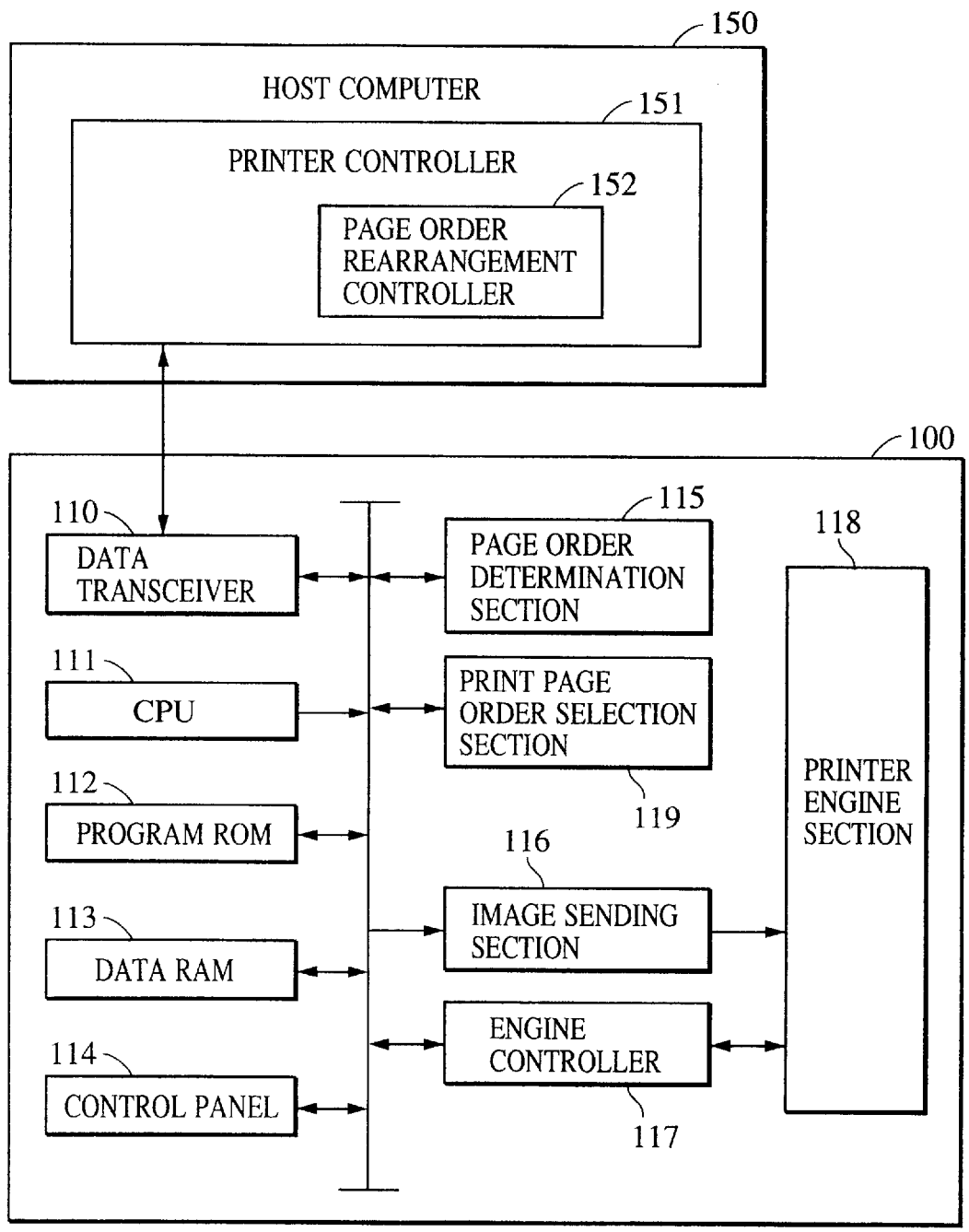
FIG. 1 is a block diagram for explaining the arrangement of a printing system according to the first embodiment of the present invention.

FIG. 1 is a block diagram for explaining the arrangement of a printing system according to the first embodiment of the present invention. This system is applied to an arrangement in which an information processing apparatus having a data source and a printer section for performing page order rearrangement control, and a printing apparatus having a predetermined printer engine, can communicate with each other through a predetermined communication medium.

Referring to FIG. 1, reference numeral 150 denotes a host computer, and reference numeral 151 denotes a printer controller which is arranged in the host computer and performs transmission/reception control with a printer 100. The printer controller 151 is controlled by a CPU (not shown) in the host computer 150, and also manages print data stored in a RAM (not shown) in a page order. Reference numeral 152 denotes a page order rearrangement controller arranged in the printer controller 151 to perform page order rearrangement control.

In the printer 100, reference numeral 110 denotes a data transceiver 110 which is controlled by a CPU 111 to perform transmission/reception of control codes and data exchanged between the printer 100 and the host computer 150. CPU 111 totally controls a printing process including a process of performing printing on both the sides of a sheet of paper, and a communication process with the host based on the various control programs stored in a program ROM 112 by controlling the respective parts connected to the CPU 111.

The program ROM 112 also stores conveyance capability resource information required to cause a page order determination section 115 to determine a page order. The conveyance capability resource information represents, for example, the maximum number of sheets of paper whose one sides are printed and other sides are set in a print waiting state and which can be stored in the printer engine section 118. The conveyance capability resource information can be stored in an NVRAM (not shown) as well as in the program ROM 112.

Reference numeral 113 denotes a data RAM which is used as a region required to interpret a control code and data or perform printing, or a region for processing an image data.

The image data processing region is constituted by a page buffer which stores intermediate data obtained by converting input data into data which can be developed into bit-map data, a frame memory which stores bit-map data obtained by developing the intermediate data, or the like.

A page order determination section 115 determines a page order for performing two-side printing at the maximum rate on the basis of print page information acquired from the host computer 150 upon control of the CPU 111 and conveyance capability resource information acquired from the program ROM 112 upon control of CPU 111. The page order determination section 115 transmits the determined page order information to the printer controller 151 of the host computer 150.

Reference numeral 116 denotes an image sending section which sends image data read from the data RAM 113 upon control of the CPU 111 to the printer engine section 118 which actually performs printing. Reference numeral 117 denotes an engine controller which performs paper conveyance in the printer engine section 118 and controls printing upon control by the CPU 111. The printer engine section 118 comprises an inversion mechanism for inverting a sheet of paper to actually print control image data on both the sides of a sheet of paper, and the printer engine section 118 is controlled by the engine controller 117 to perform feeding and inverting processes on a sheet of paper. Reference numeral 114 denotes a control panel on which are arranged keys for setting a desired print mode for the printer 100 and for switching on- and off-line, and a display unit or the like for displaying the state of the printer 100. Reference numeral 119 denotes a print page order selection section for selecting a print page order for performing two-side printing. Page order selection section 119 is discussed in more detail below with reference to FIG. 14.

The procedure of processes in this embodiment will be described below. The process on the host computer 150 side is described first. When the printer controller 151 detects a two-side print request, the printer controller 151 transfers page control information to the printer 100 to inquire about a transfer page order.

The page order rearrangement controller 152 organizes the page order of the print data transferred to the printer 100 into two-side print page order on the basis of the transfer page order data sent back from the printer 100.

On the basis of the organized two-side print page order, the printer controller 151 transfers the print data read from a storage medium to the printer 100. In this manner, a transfer page organizing process for two-side printing on the printer 100 side is performed as a pre-process on the host computer 150 side.

The process on the printer 100 side will be described below. On the basis of page control information received from the host computer 150 and the conveyance capability resource information, the page order determination section 115 determines the transfer page order data of the print data transferred from the host computer 150. The data transceiver 110 sends back the determined transfer page order data to the host computer 150. In this manner, the host computer 150 notifies the information processing apparatus of the transfer page order data according to a conveyance capability resource where the printing apparatus can obtain a two-side printing result whose pages are correctly arranged on the basis of sequentially transferred print data.

Figure 2:
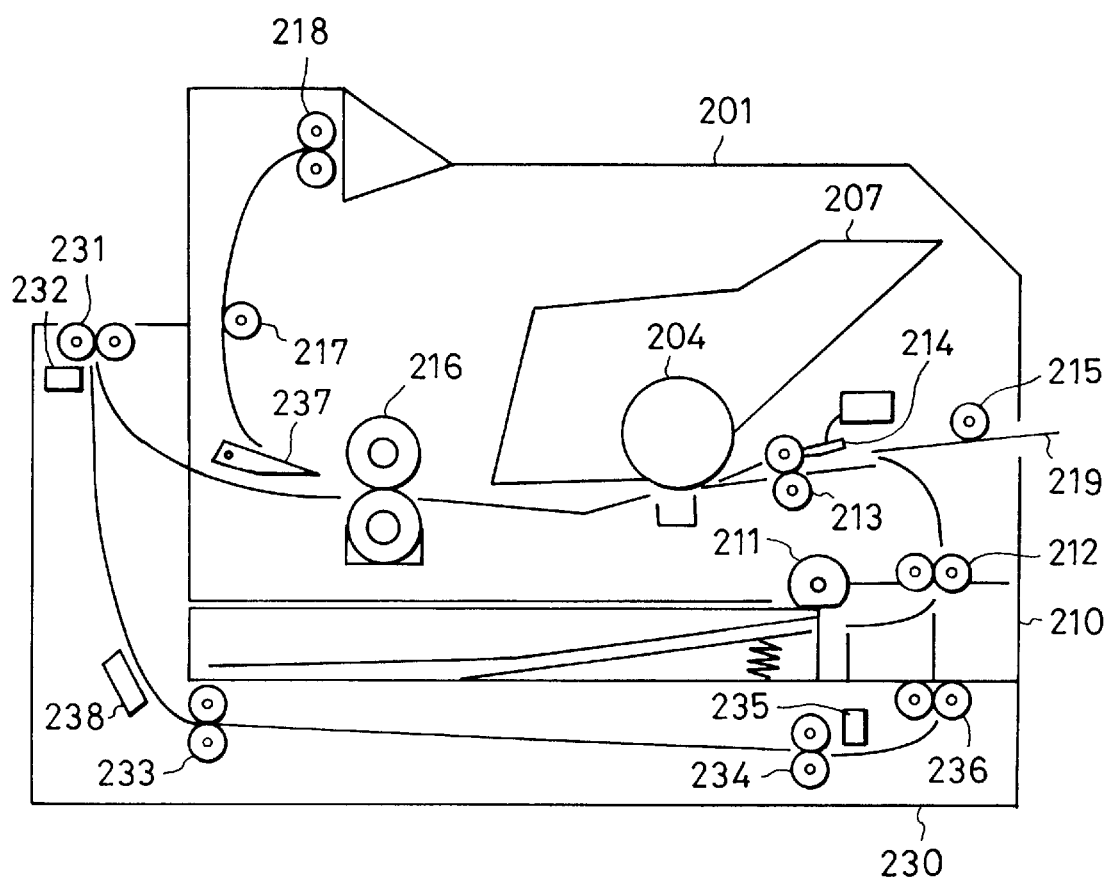
FIG. 2 is a schematic sectional view for explaining the arrangement of the printer engine section shown in FIG. 1.

FIG. 2 is a schematic sectional view for explaining the arrangement of the printer engine section 118 shown in FIG. 1.

Referring to FIG. 2, reference numeral 210 denotes a paper cassette for holding sheets of paper. The paper cassette 210 has a mechanism for electrically detecting a paper size by partition plates (not shown). Reference numeral 211 denotes a cassette paper-feed clutch. The cassette paper-feed clutch 211 is a cam which separates only an uppermost one of the sheets of paper placed on the paper cassette 210 and conveys the separated sheet to a paper-feed roller 212, and is intermittently rotated for each paper-feed operation to feed one sheet of paper in response to one rotation.

Reference numeral 214 denotes a resist shutter which presses a sheet of paper to stop a paper-feed operation. The paper-feed roller 212 conveys the leading edge of the sheet of paper to the resist shutter 214. Reference numeral 219 denotes a manual insertion tray, and reference numeral 215 denotes a manual insertion paper-feed clutch. The manual insertion paper-feed clutch 215 conveys the leading edge of a sheet of paper to the resist shutter 214. After passing through resist shutter 214, the sheet is fed by paper-feed roller 213 to a transfer section 204 discussed below. With the above paper-feed arrangement, a sheet of paper can be selectively fed from the paper cassette 210 and from the manual insertion tray 219.

Reference numeral 204 denotes a transfer section, within process cartridge 207, which transfers an image sent from the image sending section 116 shown in FIG. 1 to a sheet of paper as a toner image by a known electrophotographic scheme. On the sheet of paper to which the toner image is transferred, the toner image is thermally fixed by a fixing roller 216. For one-side printing, the sheet of paper on which the image is fixed passes through a convey roller 217, and is discharged by a paper-discharge roller 218 onto a paper-discharge tray 201 formed at the upper portion of the printer housing.

Reference numeral 230 denotes a detachable two-side unit. Reference numeral 237 denotes an inversion flapper which switches the direction of the sheet of paper sent from the fixing roller 216 to a paper-discharge direction for the paper-discharge roller 218 or a paper discharging direction for the two-side unit 230. Reference numeral 231 denotes an inversion roller 231 which can rotate in two directions.

Reference numeral 232 denotes an inversion sensor which electrically detects the trailing edge of a sheet of paper. Reference numeral 238 denotes a temporary stop sensor which electrically detects the leading edge of a sheet of paper at a position where the inverted sheet of paper is temporarily stopped. Reference numerals 233 and 236 denote convey rollers which convey an inverted sheet of paper toward the resist shutter 214 again.

Reference numeral 234 denotes a paper-refeed roller which conveys an inverted sheet of paper to the convey roller 236. Reference numeral 235 denotes a paper-refeed sensor which electrically detects the leading edge of a sheet of paper being conveyed to the convey roller 212.

In this manner, when the two-side unit 230 is attached to control the inversion flapper 237, a printed sheet of paper can be selectively discharged to the two-side unit 230 and the paper-discharge roller 218.

When the printed sheet of paper is sent to the two-side unit 230 by the inversion flapper 237, the sheet of paper is further conveyed upward by the forward rotation of the inversion roller 231 until the trailing edge of the sheet of paper is detected by the inversion sensor 232. When the trailing edge of the sheet of paper is detected by the inversion sensor 232, the inversion roller 231 is rotated backward, and the sheet of paper is conveyed toward the two-side unit until the leading edge of the sheet of paper is detected by the temporary stop sensor 238.

When the sheet of paper reaches a temporary stop position, the presence/absence of a preceding sheet of paper is checked. In this case, when a sheet of paper is detected by the paper-refeed sensor 235, the presence of the preceding sheet of paper is confirmed, and driving of the inversion roller 231 is stopped until the absence of the preceding sheet of paper is confirmed. When a preceding sheet of paper is absent, the sheet of paper is conveyed until the paper-refeed sensor 235 detects the leading edge of the sheet of paper. Thereafter, when a paper-feeding instruction is received while "two-side paper-refeeding designation" is received from the engine controller 117, the sheet of paper is refed. With the above arrangement, a sheet of paper can be selectively refed from the paper cassette 210, the manual insertion tray 219, and the two-side unit 230.

Control of a printer engine in two-side printing will be described below with reference to FIGS. 3 to 9. FIGS. 3 to 9 are views for explaining first paper-feeding states set by the printer engine section 118 shown in FIG. 2.

To explain the control of the printer engine, the following example will be used. Page data for six pages are to be printed on both the sides of three sheets of paper. The data of the first page is printed on the front side of the first sheet of paper, the data of the second page is printed on the rear side of the first sheet of paper, the data of the third page is printed on the front side of the second sheet of paper, the data of the fourth page is printed on the rear side of the second sheet of paper, the data of the fifth page is printed on the front side of the third sheet of paper, and the data of the sixth page is printed on the rear side of the third sheet of paper. In the following description, of the printed sides of a sheet of paper, a side on which a page having a small page number is printed corresponds to a front side, and a side on which a page having a large page number is printed corresponds to a rear side.

In the above drawings, P200, P201, P210 to P212, P220 to P222, P230 to P232, P240 to P242, P250, P251, and P260 denote various sides of sheets of paper in various locations within the printer engine section 118 during paper feeding.

Figure 3:
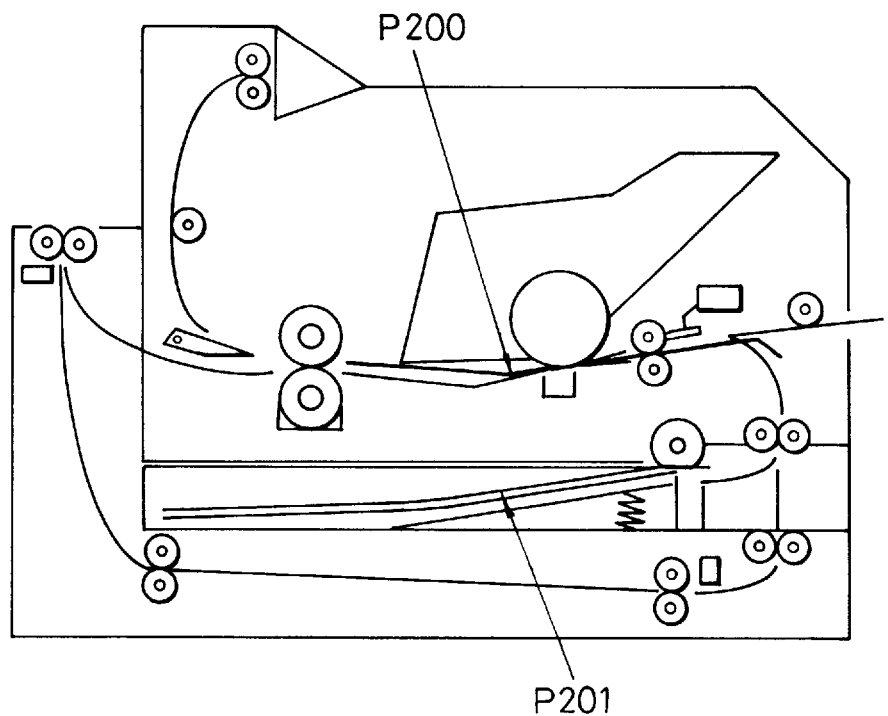
FIG. 3 shows a first paper feeding state set by the printer engine section shown in FIG. 2.

Referring to FIG. 3, the sheet P200 indicates a state wherein the front side of the first sheet of paper, i.e., the first page, is printed. This state is the same as a state for general one-side printing. The sheet P201 indicates a sheet of paper to be printed next.

Figure 4:
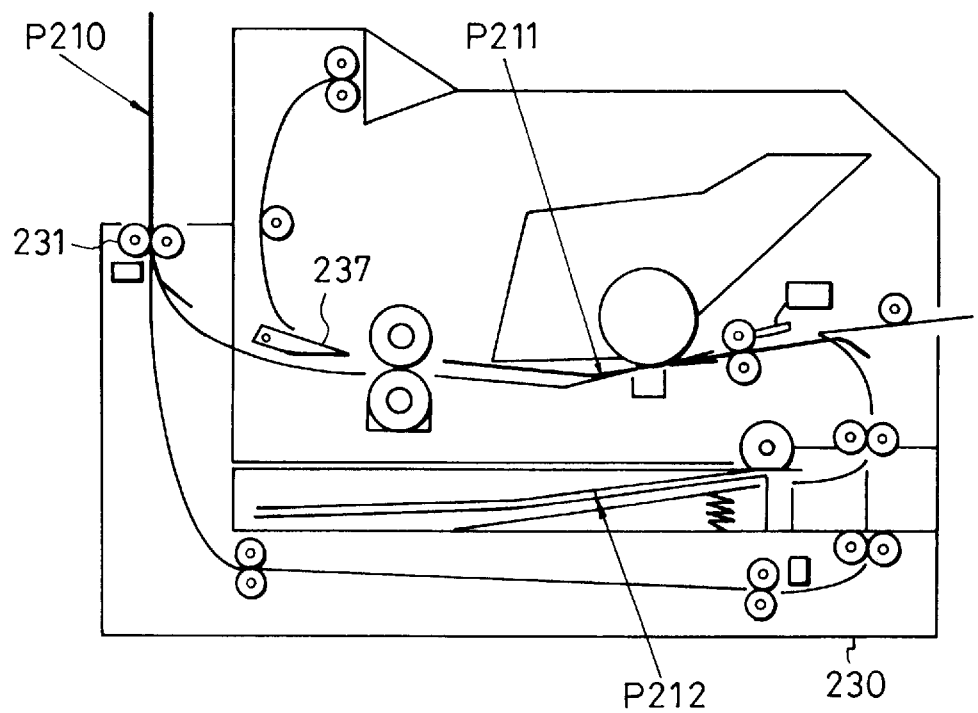
FIG. 4 shows the first paper-feeding state set by the printer engine section shown in FIG. 2.

Referring to FIG. 4, the sheet P210 indicates that the first sheet is being inverted, and the sheet P211 indicates that the front side of the second sheet of paper, i.e., the third page, is being printed. The two sheets of paper are processed in parallel. The first sheet P210 whose front-side printing is completed is discharged to the two-side unit 230 by the inversion flapper 237, and the sheet of paper is being inverted by the inversion roller 231.

The sheet of paper P212 indicates the third sheet is in a waiting state.

Figure 5:
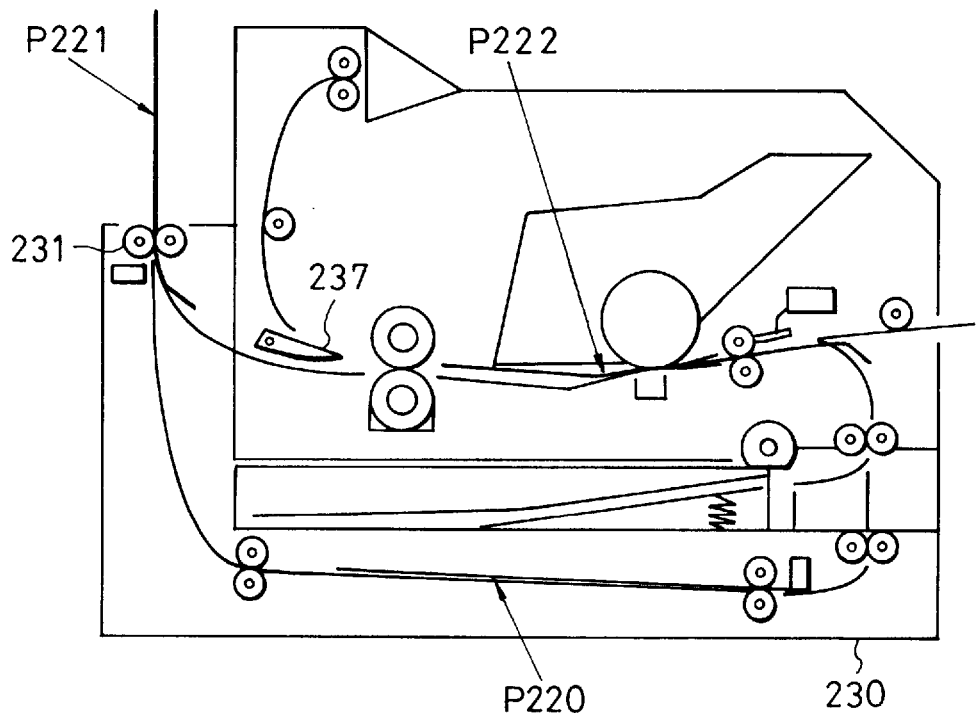
FIG. 5 shows the first paper-feeding state set by the printer engine section shown in FIG. 2.

Referring to FIG. 5, the sheet P220 indicates that the rear side of the first sheet of paper, i.e., the second page, is in a print waiting state. The sheet P221 indicates that the second sheet of paper is being inverted, and the sheet P222 indicates that the front side of the third sheet of paper, i.e., the fifth page, is being printed. The second sheet P221, as in FIG. 4, is discharged to the two-side unit 230 by the inversion flapper 237, and the sheet of paper is inverted by the inversion roller 231.

Since driving of the inversion roller 231 is stopped until the inversion roller 231 receives a paper-feeding instruction from the engine controller 117, the first sheet of paper is in a waiting state until printing of the front side of the third sheet of paper is completed.

Figure 6:
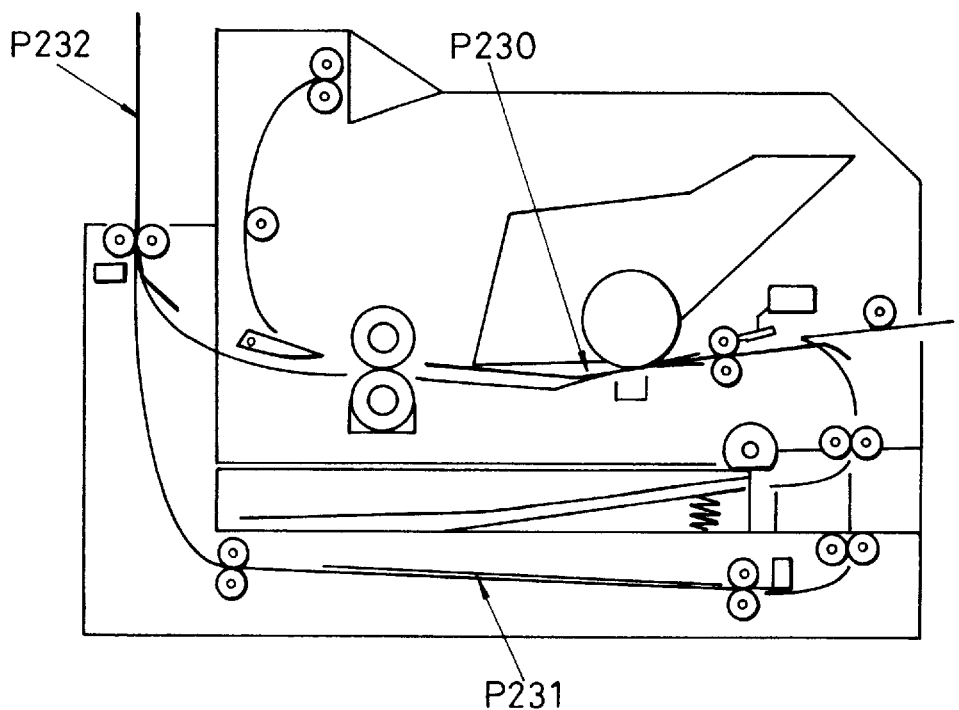
FIG. 6 shows the first paper-feeding state set by the printer engine section shown in FIG. 2.

Referring to FIG. 6, the sheet P230 indicates that the rear side of the first sheet of paper, i.e., the second page, is being printed, and the sheet P231 indicates that the rear side of the second sheet of paper, i.e., the fourth page, is in a print waiting state. The sheet P232 indicates that the third sheet of paper is being inverted.

Figure 7:
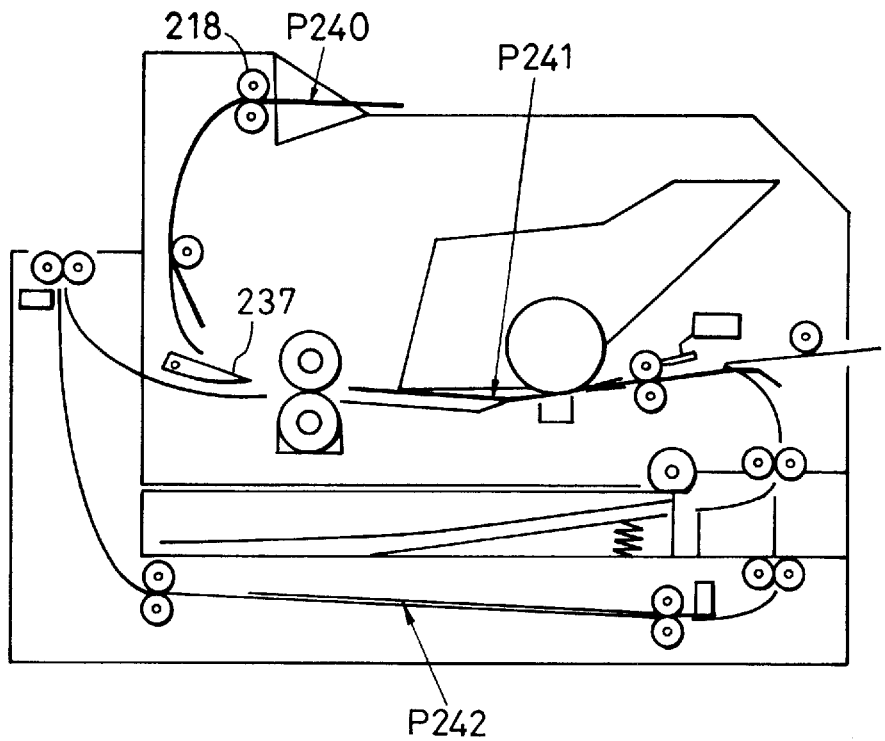
FIG. 7 shows the first paper-feeding state set by the printer engine section shown in FIG. 2.

Referring to FIG. 7, the sheet P240 indicates that the first sheet of paper whose two-side printing is completed is being discharged, the sheet P241 indicates that the rear side of the second sheet of paper, i.e., the fourth page, is in a print waiting state, and the sheet P242 indicates that the rear side of the third sheet of paper, i.e., the sixth page, is in a print waiting state. The first sheet P240 whose two-side printing is completed is selectively fed to the paper-discharge roller 218 by the inversion flapper 237, and then discharged to the paper-discharge tray of the printer housing.

Figure 8:
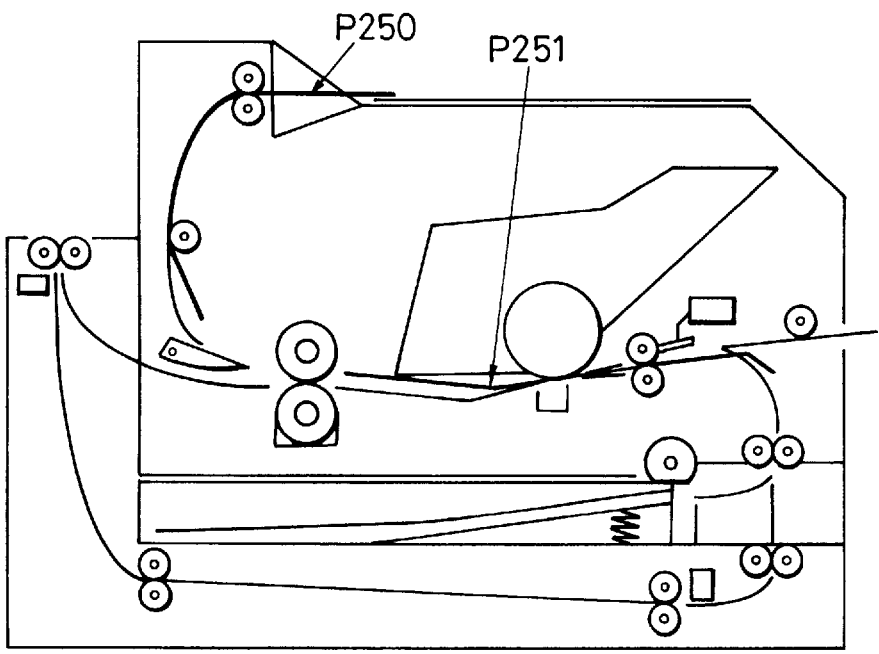
FIG. 8 shows the first paper-feeding state set by the printer engine section shown in FIG. 2.

Referring to FIG. 8, the sheet P250 indicates that the second sheet of paper whose two-side printing is completed is being discharged, and the sheet P251 indicates that the rear side of the third sheet of paper, i.e., the sixth page, is being printed.

Figure 9:
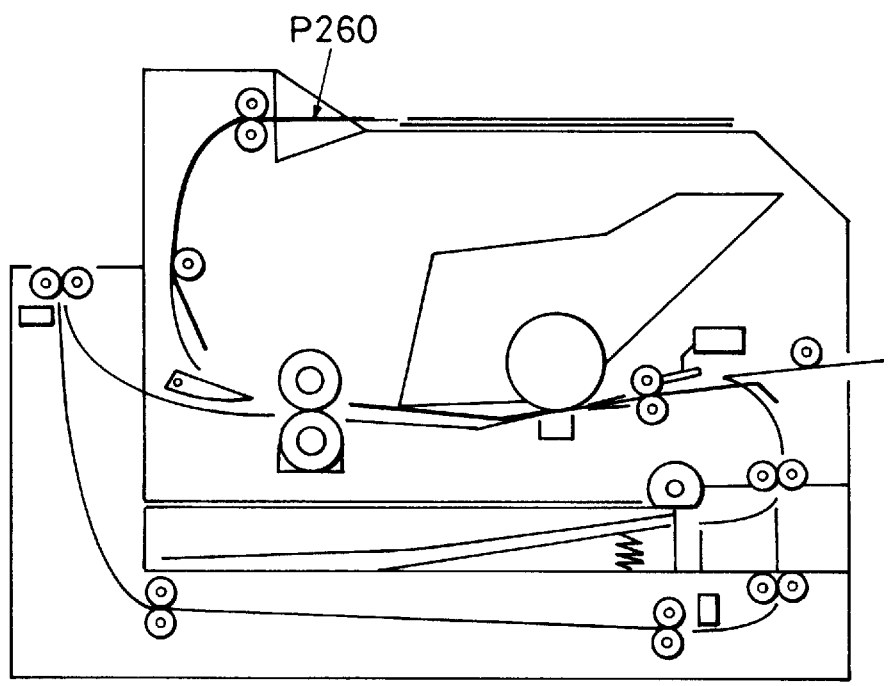
FIG. 9 shows the first paper-feeding state set by the printer engine section shown in FIG. 2.

Referring to FIG. 9, the sheet P260 indicates that the third sheet of paper whose two-side printing is completed is being discharged.

To summarize, in this example, the pages are printed in the following order:

(1) the front side of the first sheet of paper, i.e., the first page, is printed; (2) the front side of the second sheet of paper, i.e., the third page, is printed; (3) the front side of the third sheet of paper, i.e., the fifth page, is printed; (4) the rear side of the first sheet of paper, i.e., the second page, is printed; (5) the rear side of the second sheet of paper, i.e., the fourth page, is printed; and (6) the rear side of the third sheet of paper, i.e., the sixth page, is printed.

Therefore, it is clearly understood that an order, i.e., 1, 3, 5, 2, 4, and 6, is efficiently used as the order of the page data sent from the host computer 150.

As another example, when the page data for ten pages are printed on five sheets of paper, the following order is used.

The page data of the first, third, and fifth pages are printed on the front sides of the first, second, and third sheets of paper. The page data of the second page is printed on the rear side of the first sheet of paper. The procedure up to this is the same as that in the case wherein the print data of six pages are printed.

The first sheet of paper is discharged, the second sheet of paper is in a print waiting state, and the third sheet of paper is being inverted. However, at this time, the fourth sheet of paper is fed, and the data of the seventh page is printed on the front side of the fourth sheet of paper.

When the third sheet of paper is in a print waiting state, the fourth sheet of paper is being inverted, the data of the fourth page is printed on the rear side of the second sheet of paper, the second sheet of paper is discharged. The fifth sheet of paper is fed, and the data of the ninth page is printed on the front side of the fifth sheet of paper. When the fourth sheet of paper is in a print waiting state, and the fifth sheet of paper is being inverted, the data of the sixth page is printed on the rear side of the third sheet of paper, and the third sheet of paper is discharged. When the fifth sheet of paper is in a print waiting state, the data of the eighth page is printed on the rear side of the fourth sheet of paper, and the fourth sheet of paper is discharged. The data of the tenth page is printed on the rear side of the fifth sheet of paper, and the fifth sheet of paper is discharged. In this manner, when the page data of ten pages are to be printed, the data are transmitted in a specific order, i.e., 1, 3, 5, 2, 7, 4, 9, 6, 8, and 10.

A method of determining a page order for performing efficient two-side printing between the host computer 150 and the printer 100 will be described below with reference to FIGS. 10 to 12.

Figure 10:
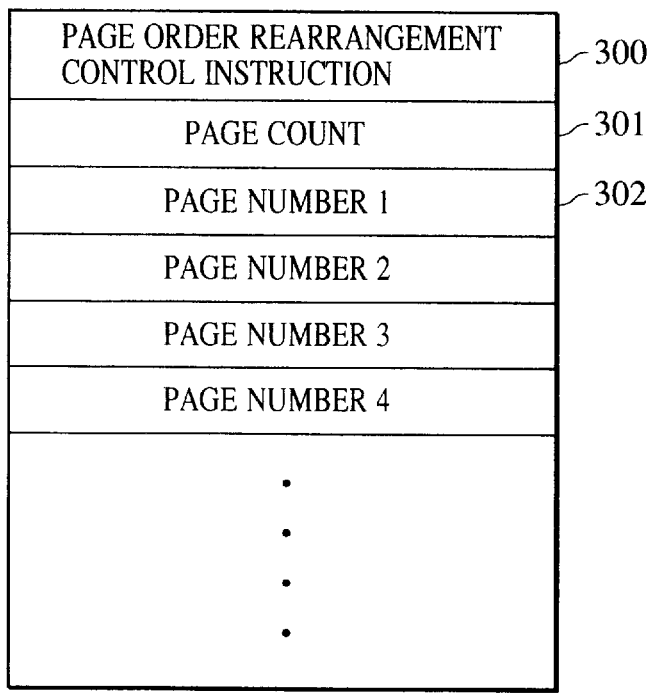
FIG. 10 is a page rearrangement control instruction transmitted from the printer controller shown in FIG. 1 to the printer.

FIG. 10 is a view showing a page rearrangement control instruction transmitted from the host computer 150 shown in FIG. 1 to the printer 100.

As shown in FIG. 10, a transmitted page rearrangement control instruction 300 includes a page count 301, and a plurality of page numbers 302. Of course, the number of pages may vary with each print job. In the page number 302, the page numbers of print data to be transmitted to the printer 100 are arranged in a descending order or an ascending order.

Figure 11:
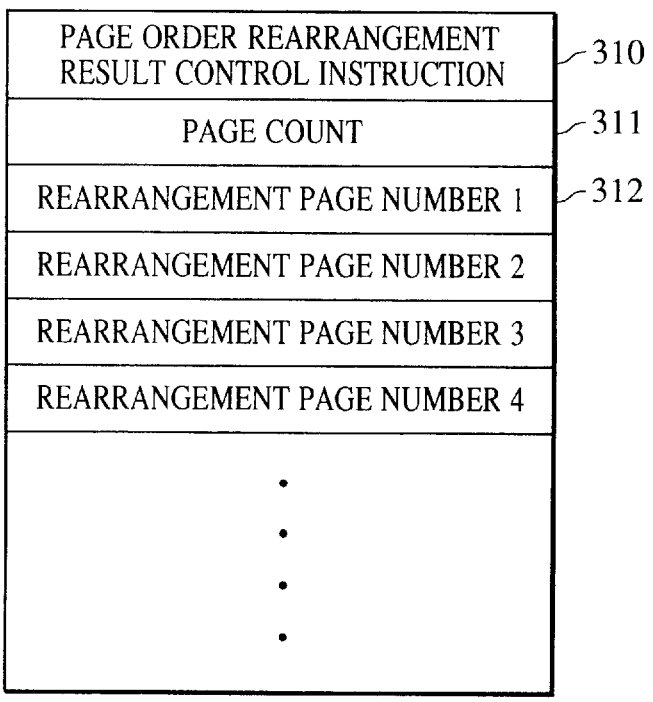
FIG. 11 is a page rearrangement result control instruction transmitted from the printer shown in FIG. 1 to the printer controller.

FIG. 11 is a view showing a page rearrangement control instruction transmitted from the printer 100 shown in FIG. 1 to the printer controller 151.

As shown in FIG. 11, a page order rearrangement result control instruction 310 is determined by the page order determination section 115 shown in FIG. 1 and, includes a page count 311, and a plurality of rearrangement page numbers 312. In the rearrangement page numbers 312, the page numbers are arranged in an actual printing order in the printer 100, i.e., an order of transmission from the printer controller 151 to the printer 100.

Figure 12:
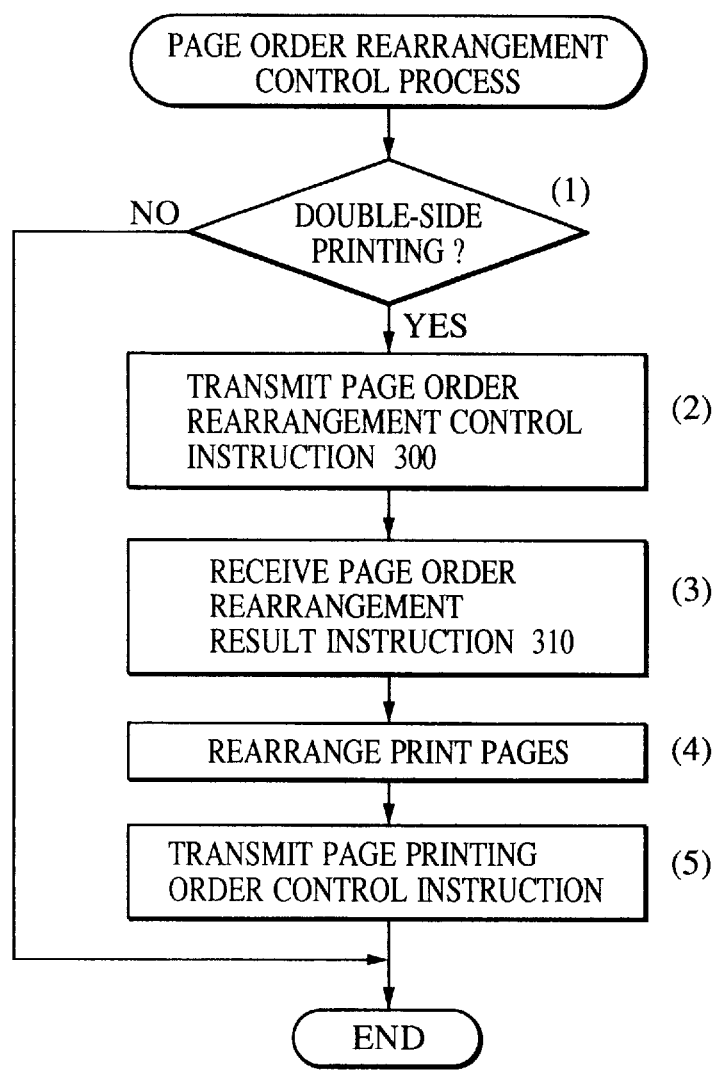
FIG. 12 is a flow chart of an embodiment of a page order rearrangement control method in a printing system according to the present invention.

FIG. 12 is a flow chart showing an embodiment of a data processing method in a printing system according to the present invention, and corresponds to a page order rearrangement control procedure. In FIG. 12, (1) to (5) indicate steps, respectively.

The page order rearrangement controller 152 of the host computer 150 checks whether two-side printing is performed (1). If NO in step (1), the process is ended. If YES in step (1), host computer 150 requests data used to determine a page order for performing printing which is transmitted in step (2) to the printer 100 as the page order rearrangement control instruction 300. In this embodiment, the information of page order rearrangement control instruction 300 is information constituted by the page count 301 to be printed and the alignment of the order of the page numbers 302. In the above case wherein the first to sixth pages are printed, the page count 301 is set to be "6", and the alignment of the order of the page numbers 302 is constituted by an order, i.e., "1, 2, 3, 4, 5, 6".

When the page rearrangement control instruction 300 is received from the host computer 150, the page order determination section 115 determines a page order, in which printing is actually performed when two-side printing of the printer is performed on the sheet of paper, based on the a conveyance capability resource stored in the program ROM 112. The page order determination section 115 transmits the determination result to the host computer 150 as the page rearrangement result control instruction 310. Instruction 310 is received by the printer controller 151 at step (3). The information of the page order rearrangement result instruction is information constituted by the page count 311 of the pages to be printed and the alignment of the order of the page numbers 312. In the above case wherein the first to sixth pages are printed, the page count 311 is set to be "6", and the order of the pages is supplied by rearrangement page numbers 312, constituted by an order, i.e., "1, 3, 5, 2, 4, 6".

When the printer controller 151 receives the information of the page order rearrangement result (page order rearrangement result instruction 310) sent back from the printer 100 in step (3), the page order rearrangement controller 152, on the host computer 150 side, performs rearrangement of the order of pages to be printed in step (4). The printer controller 151 transmits, to the printer 100, a page printing order control instruction notifying the printer 100 that pages to be printed have a page order in which printing is actually performed by the printer engine section 118 in step (5), thereby completing the process.

On the printer side, when the printer 100 receives the page printing order control instruction, the CPU 111 controls the page data to be printed to actually print the pages in the order specified.

Figure 13:
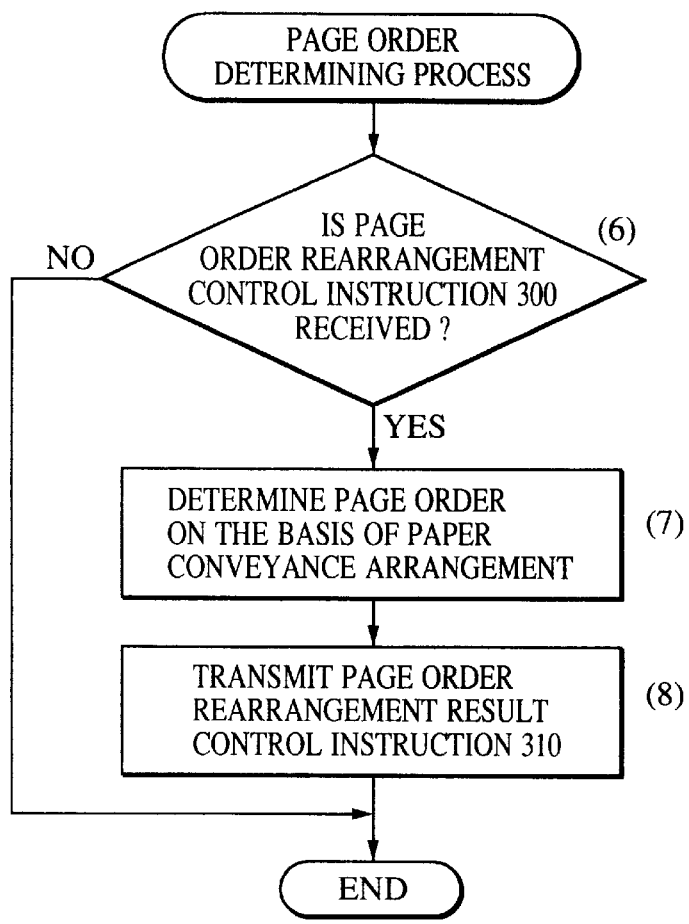
FIG. 13 is a flow chart of a procedure of a page order determining process performed by the page order determination section shown in FIG. 1.

FIG. 13 is a flow chart showing a procedure of a page order determining process performed by the page order determination section 115 shown in FIG. 1. In FIG. 13, (6) to (8) indicate steps, respectively.

The above process is started at step (6). That step checks whether the page order rearrangement control instruction 300, shown in FIG. 10, is received from the host computer 150. If NO in step (6), the process is ended. If YES in step (6), the page order determination section 115 checks a paper conveyance arrangement based on the conveyance capability resource stored in the program ROM 112 to determine a page order in step (7). The conveyance capability resource information is constituted by information representing the presence or absence of the two-side unit 230, specification information of the two-side unit, the number of sheets of paper reserved in the printer engine section 118 after one-side printing is completed, and the like. In this embodiment, two sheets of paper are reserved after oneside printing is completed, and data representing this reserve is stored in the program ROM 112 as conveyance capability information.

In step (8), the data transceiver 110 transmits the determined page order to the host computer 150 as the page order rearrangement result control instruction 310 (received by the printer controller 151 in step (3) in FIG. 12), thereby completing the process.

Figure 14:
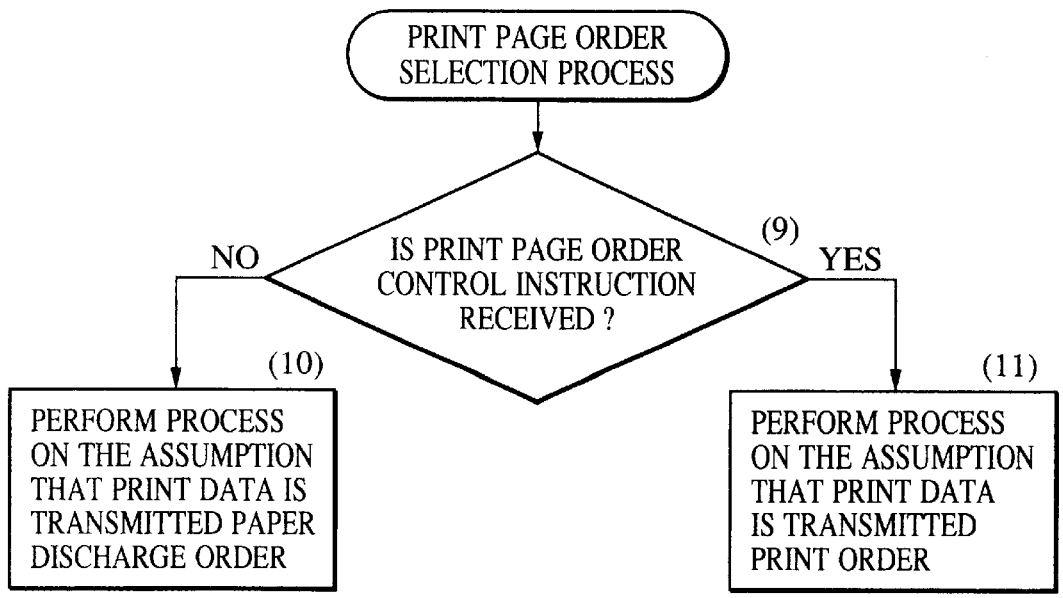
FIG. 14 is a flow chart of a procedure of a print page order selection process performed by the print page order selection section shown in FIG. 1.

FIG. 14 is a flow chart showing a print page order selection process performed by the print page order selection section 119 shown in FIG. 1. In FIG. 14, (9) to (11) indicate steps in the process.

Step 9 checks whether the print page order selection section 119 receives a page print order control instruction from the host computer 150. If NO in step (9), the process is performed in step (10) on the assumption that print data are transmitted from the host computer 150 in a paper-discharge order. If YES in step (9), the process is performed in step (11) on the assumption that print data are transmitted in the printing order.

Second Embodiment

In one-side printing, a printing method in which printing is performed on the lower side of a discharged sheet of paper is generally called a face-down method, a printing method in which printing is performed on the upper side is called a face-up method.

In the face-down method, when page data are transmitted in an ascending order, the pages are arranged in a correct order when sheets of paper are discharged.

When the arrangement of the printer engine section 118 described in the first embodiment is the arrangement shown in FIG. 2, the side on which printing is performed last faces downward. Therefore, when sheets of paper are discharged by the face-down method in the above engine arrangement, printing on the rear side of one sheet of paper is performed first, and printing on the front side is performed second.

However, the front side of one sheet of paper has a page number smaller than that of the rear side. For this reason, in general printing, the page data on a front side which arrives first is stored, and printing on the rear side is performed first.

When control in which the host computer 150 transfers print data in the order of pages actually printed is applied to the printer 100 described in the first embodiment of the present invention, i.e., when paper discharge handles both the front and rear sides of the sheet of paper, paper discharge using the face-down method can be performed without a region in which page data is temporarily stored.

In order to explain control of a printer engine in two-side printing when paper is discharged using the face-down method, a case wherein the page data of the first to sixth pages are printed on both the sides of three sheets of paper will be described below with reference to FIGS. 13 to 19.

FIGS. 15 to 21 are views for explaining a second paper-feeding state set by the printer engine section 118 shown in FIG. 2. A case wherein the page data of the first to sixth pages are printed on both the sides of three sheets of paper will be described below.

In these drawings, P400, P401, P410 to P412, P420 to P422, P430 to P432, P440 to P442, P450, P451, and P460 respectively indicate sheets of paper.

Figure 15:
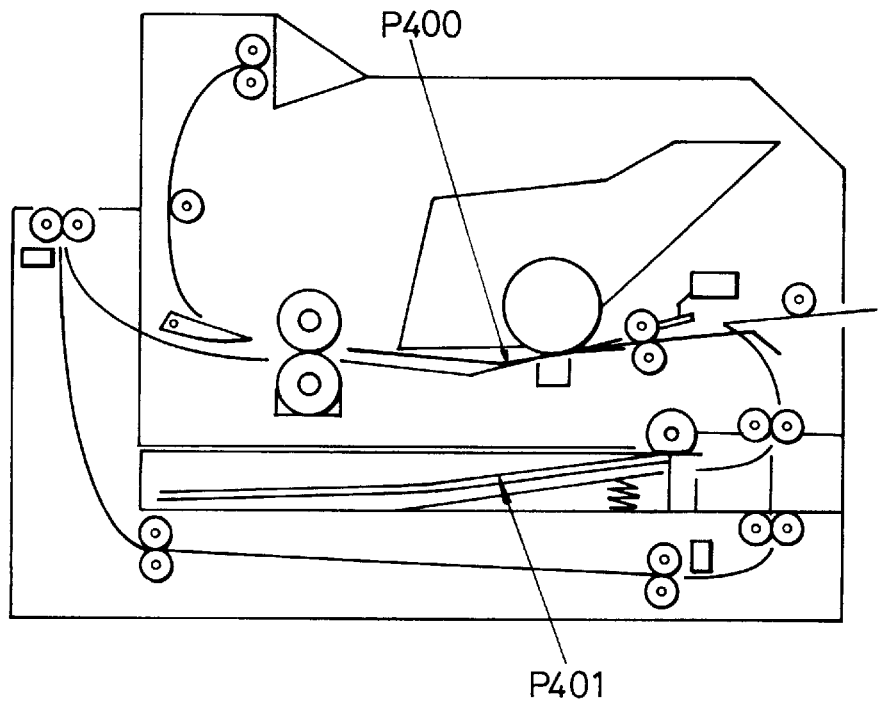
FIG. 15 shows a second paper-feeding state set by the printer engine section shown in FIG. 2.

Referring to FIG. 15, the sheet P400 indicates that the rear side of the first sheet of paper, i.e., the second page, is printed. The second embodiment is different from the first embodiment in that printing on a rear side is performed prior to printing on a front side. Reference symbol P401 denotes a sheet of paper to be printed next.

Figure 16:
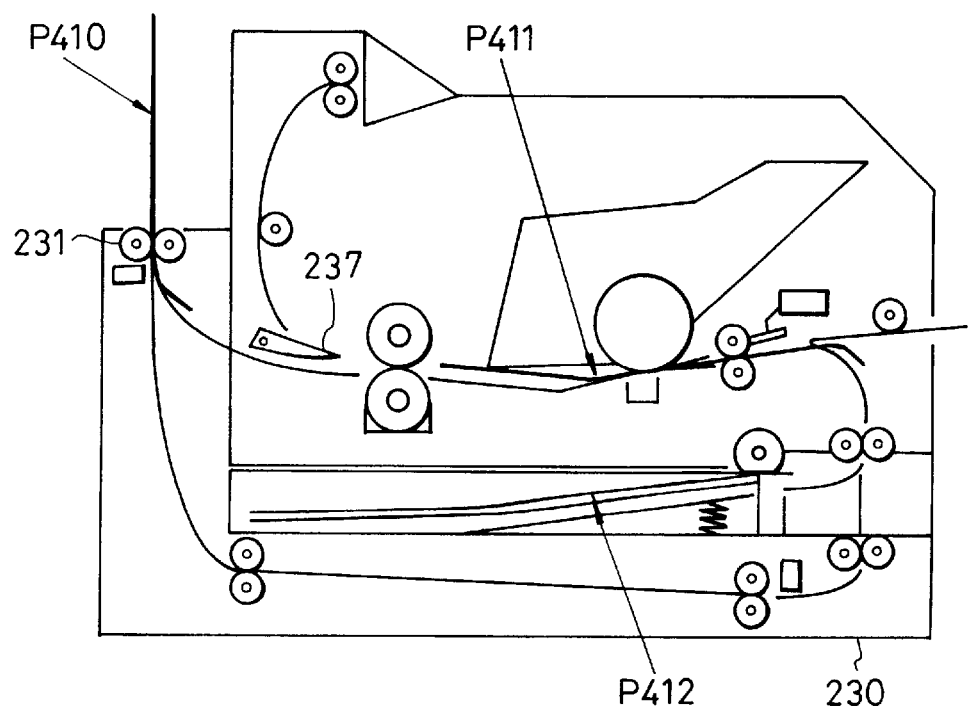
FIG. 16 shows the second paper-feeding state set by the printer engine section shown in FIG. 2.

Referring to FIG. 16, the sheet P410 indicates that the first sheet of paper is being inverted, and the sheet P411 indicates that the rear side of the second sheet of paper, i.e., the fourth page, is being printed. The two sheets of paper are processed in parallel. The first sheet of paper whose rear-side printing is completed is discharged to the two-side unit 230 by the inversion flapper 237, and then inverted by the inversion roller 231. Reference symbol P412 indicates a sheet of paper to be printed next.

Figure 17:
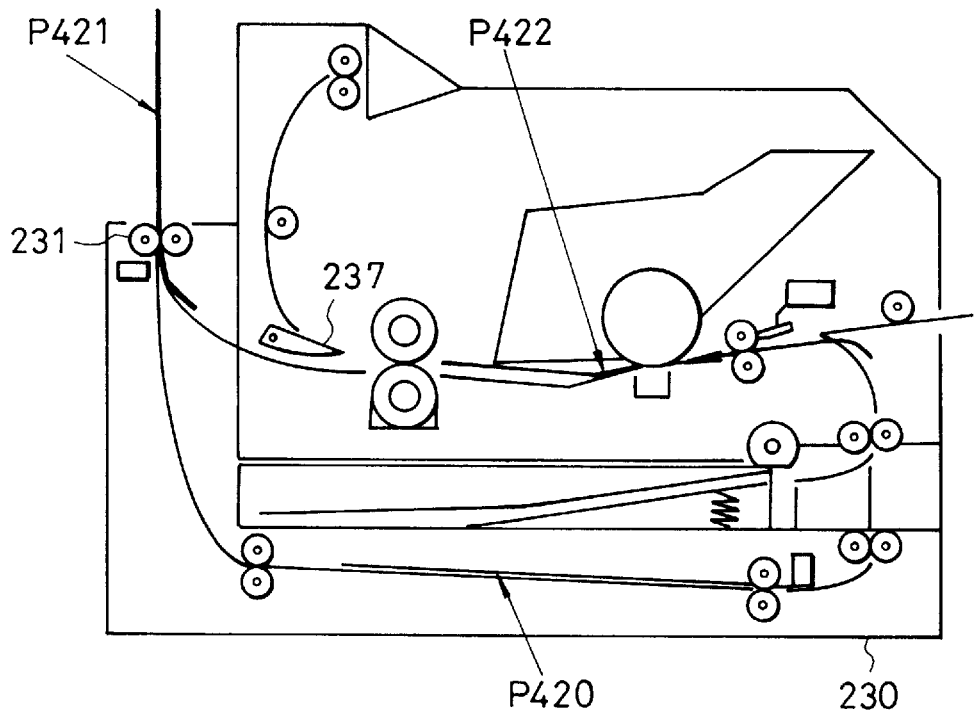
FIG. 17 shows the second paper-feeding state set by the printer engine section shown in FIG. 2.

Referring to FIG. 17, the sheet P420 indicates that the front side of the first sheet of paper, i.e., the first page, is in a print waiting state, the sheet P421 indicates that the second sheet of paper is being inverted, and the sheet P422 indicates that the rear side of the third sheet of paper, i.e., the sixth page, is being printed. The second sheet of paper, as in FIG. 16, is discharged to the two-side unit 230 by the inversion flapper 237, and the sheet of paper is inverted by the inversion roller 231. Since driving of the inversion roller 231 is stopped until the inversion roller 231 receives a paper-feeding instruction from the engine controller 117, the first sheet of paper is in a waiting state until printing of the rear side of the third sheet of paper is completed.

Figure 18:
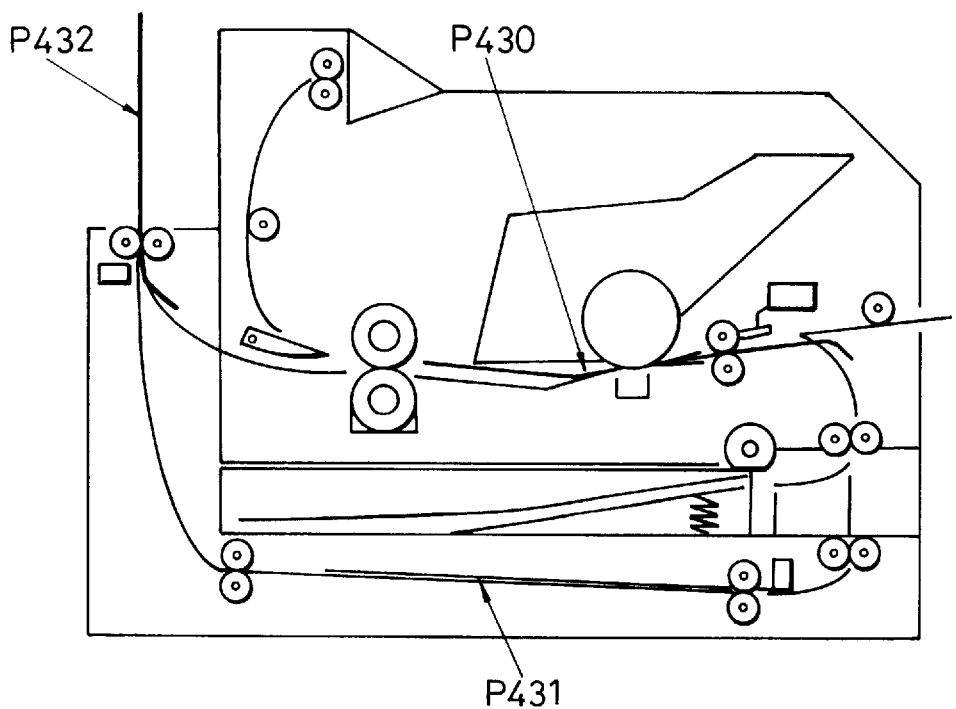
FIG. 18 shows the second paper-feeding state set by the printer engine section shown in FIG. 2.

Referring to FIG. 18, the sheet P430 indicates that the front side of the first sheet of paper, i.e., the first page, is being printed, and the sheet P431 indicates that the front side of the second sheet of paper, i.e., the third page, is in a print waiting state. The sheet P432 indicates that the third sheet of paper is being inverted.

Figure 19:
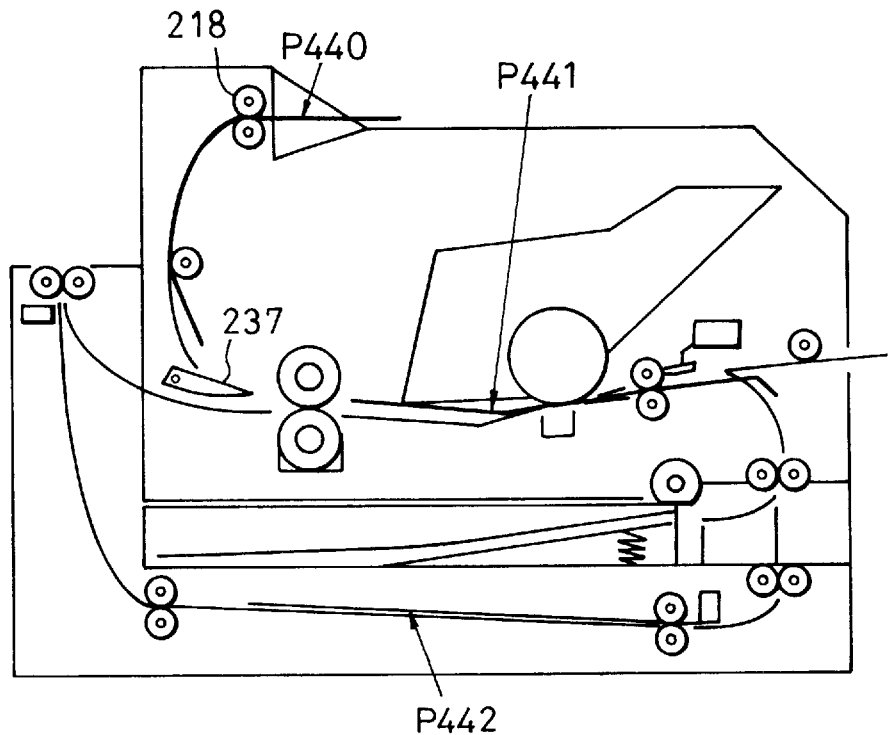
FIG. 19 shows the second paper-feeding state set by the printer engine section shown in FIG. 2.

Referring to FIG. 19, the sheet P440 indicates that the first sheet of paper whose two-side printing is completed is being discharged, the sheet P441 indicates that the front side of the second sheet of paper, i.e., the third page, is being printed, and the sheet P442 indicates that the front side of the third sheet of paper, i.e., the fifth page, is in a print waiting state. The first sheet of paper whose two-side printing is completed is selectively fed to the paper-discharge roller 218 by the inversion flapper 237, and then discharged to the paper-discharge tray of the printer housing. After the first sheet of paper is discharged, the front side of the sheet of paper faces downward. For this reason, paper discharge is performed by a face-down method, and pages are arranged in a correct order when the sheets of paper are extracted after all the sheets of paper are discharged.

Figure 20:
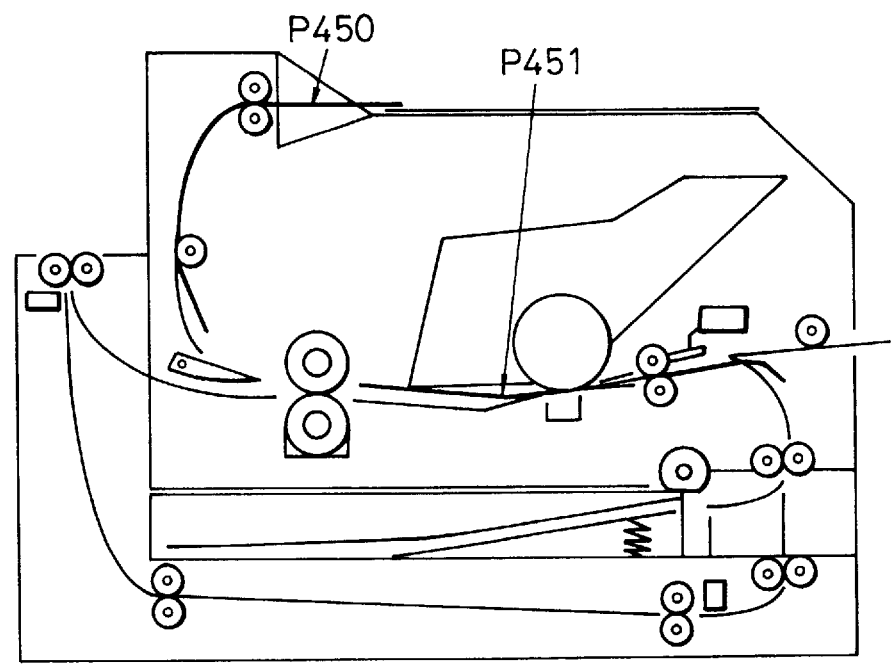
FIG. 20 shows the second paper-feeding state set by the printer engine section shown in FIG. 2.

Referring to FIG. 20, the sheet P450 indicates that the second sheet of paper whose two-side printing is completed is being discharged, and the sheet P451 indicates that the front side of the third sheet of paper, i.e., the fifth page, is being printed.

Figure 21:
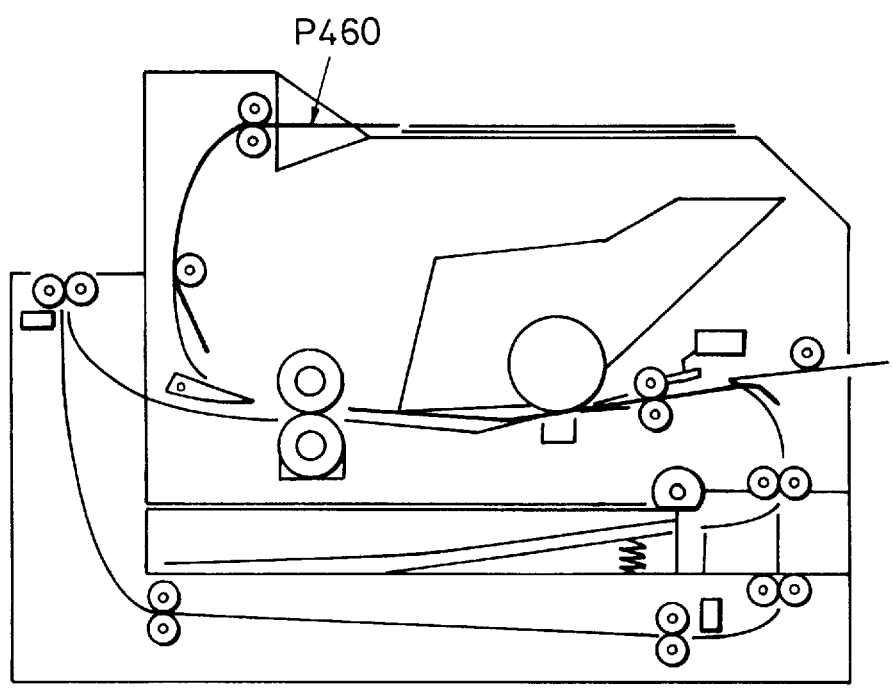
FIG. 21 shows the second paper-feeding state set by the printer engine section shown in FIG. 2.
Figure 22:
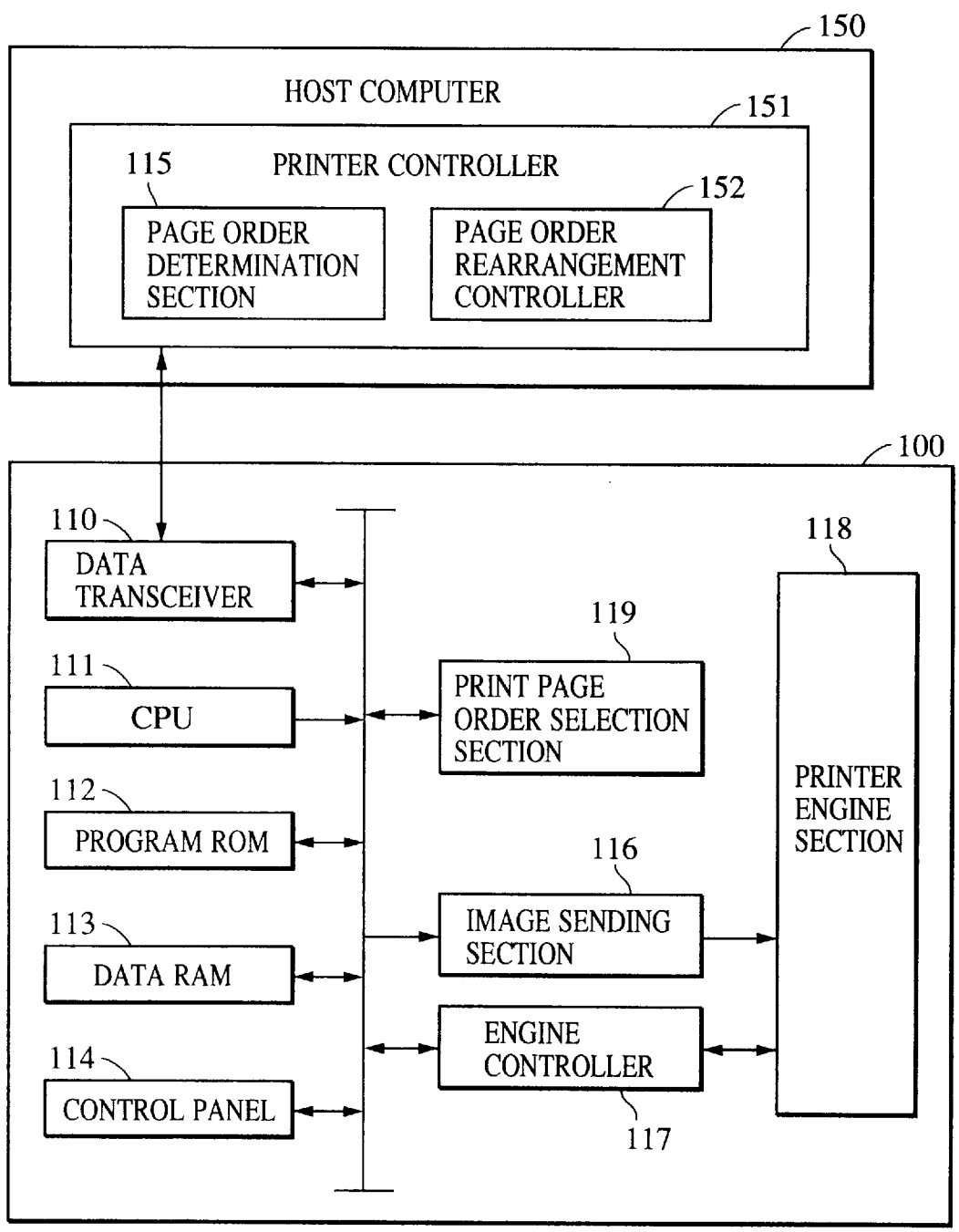
FIG. 22 is a block diagram for explaining the arrangement of a printing system according to the third embodiment of the present invention.

Referring to FIG. 21, the sheet P460 indicates that the third sheet of paper whose two-side printing is completed is being discharged.

To summarize, in this example, the pages are printed in the following order: (1) the rear side of the first sheet of paper, i.e., the second page, is printed; (2) the rear side of the second sheet of paper, i.e., the fourth page, is printed; (3) the rear side of the third sheet of paper, i.e., the sixth page, is printed; (4) the front side of the first sheet of paper, i.e., the first page, is printed; (5) the front side of the second sheet of paper, i.e., the third page, is printed; and (6) the front side of the third sheet of paper, i.e., the fifth page, is printed.

Therefore, it is understood that the order of page data sent from the host computer 150 is preferably determined as an order, i.e., 2, 4, 6, 1, 3, and 5.

In this manner, on the basis of data acquired from the page order rearrangement controller 152 and representing the order of pages to be printed and conveyance capability resource information acquired from the program ROM 112, the page order determination section 115 determines the order of actually printed pages in consideration of the front/rear sides of the discharged sheets of paper.

Third Embodiment

In the first and second embodiments, the host computer 150 causes the printer 100 to determine an appropriate page order. However, if the host computer 150 recognizes the convey arrangement of two-side printing of the printer 100, the order of pages actually printed by the printer can be determined by the host itself without inquiring of the printer 100 about the page order, and the same effects as those of the first and second embodiments can be obtained.

In this case, the page order determination section 115 in FIG. 1 described in the first embodiment is not present in the printer, but instead is part of the printer controller 151 of the host computer 150 (as a part of a printer driver (functioning as a printer control program)).

The correspondence between this embodiment and the respective means of the fifth aspect of the invention and the functions of the embodiment will be described below with reference to the foregoing Figures. Although a system arrangement is almost the same as that in FIG. 1, it is assumed that a determination means serving as the page order determination section 115 is arranged in the printer controller 151. In this embodiment, the host computer 150 communicates with the printer 100 to acquire the conveyance capability resource information of the printer 100 from, for example, the program ROM 112 of the printer 100.

In the host computer 150, the process is performed by the following procedure. When the printer controller 151 detects a two-side printing request, the printer 100 inquires of the printer 100 about conveyance capability resource information. The conveyance capability resource information stored in a resource storage means is sent back to the printer controller 151 by the data transceiver 110 in accordance with the inquiry. On the basis of the conveyance capability resource information and the page control information of print data in the page order rearrangement controller 152, the page order rearrangement controller 152 determines transfer page order data of the print data transferred from the host computer 150. On the basis of the determined transfer page order data, the page order rearrangement controller 152 organizes the page order of the print data transferred to the printer 100 into a two-side print page order. On the basis of the two-side print page order, the page order rearrangement controller 152 transfers the print data read from the storage means to the printer 100.

On the other hand, in the printer, the same processes as those in the first embodiment are performed, except that the process in the page order determination section 115, shown in FIG. 13, is not performed.

The present invention may be applied to a system constituted by a plurality of devices or an apparatus constituted by one device. The present invention can also be applied to a case wherein the object of the present invention is achieved by supplying a program to a system or an apparatus as a matter of course. In this case, when data stored in a storage medium in which a program expressed by software for achieving the present invention is read into the system or the apparatus, the system or the apparatus can achieve the results of the present invention.

In addition, when a program expressed by software for achieving the present invention is down-loaded from a database on a network by a communication program to be read, the system or the apparatus can achieve the results of the present invention.

As has been described, according to the first aspect of the present invention, a transfer page organizing process for two-side printing on a printing apparatus side is performed on a data processing apparatus side as a pre-process, and print data can be continuously transferred to the printing apparatus in a page order in which a two-side printing result can be obtained without requiring a memory of the printing apparatus to be loaded.

According to the second aspect, the information processing apparatus can be informed of transfer page order data according to a conveyance capability resource where the printing apparatus can acquire a two-side printing result whose pages are correctly arranged on the basis of the print data sequentially transferred by the information processing apparatus.

According to the third aspect, the information processing apparatus is informed of transfer page order data according to a conveyance capability resource where the printing apparatus can acquire a two-side printing result whose pages are correctly arranged on the basis of the print data sequentially transferred by the information processing apparatus, a transfer page organizing process for two-side printing on the printing apparatus side is performed on the data processing apparatus side as a pre-process, and the print data can be continuously transferred to the printing apparatus in a page order in which the two-side printing result can be obtained without requiring a memory of the printing apparatus to be loaded.

According to the fourth aspect, the information processing apparatus is informed of transfer page order data according to a conveyance capability resource where the printing apparatus can acquire a two-side printing result whose pages are correctly arranged on the basis of the print data sequentially transferred by the information processing apparatus, a transfer page organizing process for two-side printing on the printing apparatus side is performed on the data processing apparatus side as a pre-process, and the process of continuously transferring the print data to the printing apparatus in a page order in which the two-side printing result can be obtained without requiring a memory of the printing apparatus to be loaded can be automatically performed.

According to the fifth aspect, the information processing apparatus determines transfer page order data according to a conveyance capability resource where the printing apparatus can acquire a two-side printing result whose pages are correctly arranged on the basis of the print data sequentially transferred by the information processing apparatus, a transfer page organizing process for two-side printing on the printing apparatus side is performed on the data processing apparatus side as a pre-process, and the print data can be continuously transferred to the printing apparatus in a page order in which the two-side printing result can be obtained without requiring a memory of the printing apparatus to be loaded.

Therefore, an effect that an optimum two-side print output whose pages are correctly ordered can be obtained at a high throughput without increasing the memory resource of the printing apparatus can be achieved.

The individual components shown in outline or designated by blocks in the drawings are all well known in the information processing arts. Their specific construction and operation are not critical to the operation or best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for use with a printing apparatus, said information processing apparatus comprising:

detection means for detecting the presence/absence of a two-side printing request to the printing apparatus;

request means for requesting data regarding the printing apparatus used to determine a page order of print data transferred to the printing apparatus;

page organizing means for organizing the page order of the print data transmitted to the printing apparatus based on the data sent back from the printing apparatus in response to said request means when said detection means detects the two-side printing request; and transmitting means for transmitting to the printing apparatus the print data in a page order in which the print data is to be printed by the printing apparatus.

2. An information processing apparatus according to claim 1, wherein said request means requests data representing the page order of the print data transmitted to the printing apparatus, and said page organizing means organizes the print data transmitted to the printing apparatus in the page order determined by the data.

3. An information processing apparatus according to claim 1, wherein said request means requests data representing a function of the printing apparatus, and said page organizing means determines the page order of the print data transmitted to the printing apparatus, based on the data, to organize the print data based on the determined page order.

4. An information processing apparatus according to claim 3, wherein said page organizing means performs organization in a page order in which, for print data printed on both sides of a sheet of paper, print data having a larger page number is transmitted prior to print data to be printed on the sheet of paper and having a smaller page number.

5. A printing apparatus comprising:

printing means for performing printing on a recording medium based on print data received from an information processing apparatus;

paper-refeeding means for inversely conveying the recording medium of which a first side has been printed by said printing means, and which has been discharged, and for refeeding the recording medium to said printing means so that a second side of the recording medium serves as a print side;

receiving means for receiving from said information processing apparatus a request regarding said printing apparatus used to determine a rearranged page order of the print data transmitted from said information processing apparatus; and means for sending back the data to the information processing apparatus in response to the received request.

6. A printing apparatus according to claim 5, wherein when print data is printed on both sides of the recording medium, print data having a larger page number is transmitted prior to print data to be printed on the recording medium having a smaller page number.

7. An information processing method for use in a printing apparatus, said information processing method comprising the steps of:

detecting the presence/absence of a two-side printing request to the printing apparatus;

requesting data regarding the printing apparatus used to determine a page order of print data transmitted to the printing apparatus;

organizing the page order of the print data transmitted to the printing apparatus based on the data sent back from the printing apparatus in response to said request step when said detecting step detects the two-side printing request; and transmitting to the printing apparatus the print data in a page order in which the print data is to be printed by the printing apparatus.

8. An information processing method according to claim 7, wherein said requesting step requests data representing the page order of the print data transmitted to the printing apparatus, and said organizing step organizes the print data transmitted to the printing apparatus in the page order determined by the data.

9. An information processing method according to claim 7, wherein said requesting step requests data representing a function of the printing apparatus, and said organizing step determines the page order of the print data transmitted to the printing apparatus, based on the data, to organize the print data based on the determined page order.

10. An information processing apparatus according to claim 9, wherein said organizing step performs organization in a page order in which, for print data printed on both sides of a sheet of paper, print data having a larger page number is transmitted prior to print data to be printed on the sheet of paper and having a smaller page number.

11. A printing method in a printing apparatus having printing means for performing printing on a recording medium based on print data received from an information processing apparatus, and paper-refeeding means for inversely conveying the recording medium of which a first side has been printed by the printing means, and which has been discharged, and for refeeding the recording medium to the printing means so that a second side of the recording medium serves as a print side, said method comprising the steps of:

receiving from said information processing apparatus a request regarding the printing apparatus used to determine a rearranged page order of the print data transmitted from the information processing apparatus; and sending back the data to the information processing apparatus in response to the received request.

12. A printing method according to claim 11, wherein when print data is printed on both sides of the recording medium, print data having a larger page number is transmitted prior to print data to be printed on the recording medium having a smaller page number.

13. A storage medium which stores a readable program applied to an information processing apparatus, said program comprising the steps of:

detecting the presence/absence of a two-side printing request to a printing apparatus;

requesting data regarding the printing apparatus used to determine a page order of print data transmitted to the printing apparatus;

organizing the page order of the print data transmitted to the printing apparatus based on the data sent back from the printing apparatus in response to said request step when said detecting step detects the two-side printing request; and transmitting to the printing apparatus the print data in a page order in which the print data is to be printed by the printing apparatus.

14. A storage medium according to claim 13, wherein said requesting step requests data representing the page order of the print data transmitted to the printing apparatus, and said organizing step organizes the print data transmitted to the printing apparatus in the page order determined by the data.

15. A storage medium according to claim 13, wherein said requesting step requests data representing a function of the printing apparatus, and said organizing step determines the page order of the print data transmitted to the printing apparatus, based on the data, to organize the print data based on the determined page order.

16. A storage medium according to claim 15, wherein said organizing step performs organization in a page order in which, for print data printed on both sides of a sheet of paper, print data having a larger page number is transmitted prior to print data to be printed on the sheet of paper and having a smaller page number.

17. A storage medium which stores a readable program applied to a printing apparatus having printing means for performing printing on a recording medium based on print data received from an information processing apparatus, and paper-refeeding means for inversely conveying the recording medium of which a first side has been printed by the printing means, and which has been discharged, and for refeeding the recording medium to the printing means so that a second side of the recording medium serves as a print side, said program comprising the steps of:

receiving from said information processing apparatus a request regarding the printing apparatus used to determine a rearranged page order of the print data transmitted from the information processing apparatus; and sending back the data to the information processing apparatus in response to the received request.

18. A storage medium according to claim 17, wherein when print data ifs printed on both sides of the recording medium, print data having a larger page number is transmitted prior to print data to be printed on the recording medium having a smaller page number.

* * * * *

UNITED STATES PATENT AND TRADEMARK OFFICE
CERTIFICATE OF CORRECTION

PATENT NO. : 5,872,900

DATED : February 16, 1999

INVENTOR(S) : NAOKI TSUCHITOI

It is certified that error appears in the above-identified patent and that said Letters Patent is hereby corrected as shown below:

COLUMN 1

Line 14, "transmission" should read --transmission of--.

COLUMN 2

Line 35, "relates" should read --relates to--.

COLUMN 9

Line 34, "the a" should read --the--.

COLUMN 10

Line 12, "oneside" should read --one-side--.

UNITED STATES PATENT AND TRADEMARK OFFICE
CERTIFICATE OF CORRECTION

PATENT NO. : 5,872,900

DATED : February 16, 1999

INVENTOR(S) : NAOKI TSUCHITOI

It is certified that error appears in the above-identified patent and that said Letters Patent is hereby corrected as shown below:

COLUMN 16

Line 54, "ifs" should read --is--.

Signed and Sealed this

Twenty-fourth Day of October, 2000

Attest:

Q. TODD DICKINSON

Attesting Officer

Director of Patents and Trademarks